United States Patent
Weber

(10) Patent No.: US 11,043,865 B2
(45) Date of Patent: Jun. 22, 2021

(54) ROTOR FOR AN ELECTRIC MACHINE

(71) Applicant: AUDI AG, Ingolstadt (DE)

(72) Inventor: Korbinian Weber, Ingolstadt (DE)

(73) Assignee: AUDI AG, Ingolstadt (DE)

(*) Notice: Subject to any disclaimer, the term of this patent is extended or adjusted under 35 U.S.C. 154(b) by 506 days.

(21) Appl. No.: 16/036,210

(22) Filed: Jul. 16, 2018

(65) Prior Publication Data

US 2019/0044402 A1 Feb. 7, 2019

(30) Foreign Application Priority Data

Aug. 1, 2017 (DE) ..................... 10 2017 213 227.2

(51) Int. Cl.
| | |
|---|---|
| *H02K 1/32* | (2006.01) |
| *H02K 9/20* | (2006.01) |
| *H02K 7/00* | (2006.01) |
| *H02K 17/16* | (2006.01) |
| *H02K 9/19* | (2006.01) |
| *H02K 1/24* | (2006.01) |
| *H02K 3/24* | (2006.01) |

(52) U.S. Cl.
CPC .................. *H02K 1/32* (2013.01); *H02K 1/24* (2013.01); *H02K 3/24* (2013.01); *H02K 7/003* (2013.01); *H02K 9/19* (2013.01); *H02K 9/20* (2013.01); *H02K 17/16* (2013.01); *H02K 17/165* (2013.01)

(58) Field of Classification Search
CPC .. H02K 3/24; H02K 1/32; H02K 9/20; H02K 7/003; H02K 1/24; H02K 17/16; H02K 17/165; H02K 9/22; H02K 9/193; H02K 9/197

USPC .................................................. 310/211, 54
See application file for complete search history.

(56) References Cited

U.S. PATENT DOCUMENTS

| | | | | |
|---|---|---|---|---|
| 3,521,094 A | * | 7/1970 | Widder ..................... | H02K 9/19 310/58 |
| 4,137,472 A | * | 1/1979 | Workman ................. | H02K 9/20 165/104.25 |
| 4,315,172 A | | 2/1982 | Intichar et al. | |
| 4,976,308 A | | 12/1990 | Faghri | |
| 5,952,764 A | * | 9/1999 | Nakamura ......... | B22D 19/0054 310/211 |
| 9,065,313 B2 | | 6/2015 | Chang et al. | |

(Continued)

FOREIGN PATENT DOCUMENTS

| | | | |
|---|---|---|---|
| CN | 104242519 A | 12/2014 | |
| CN | 104578504 A | 4/2015 | |

(Continued)

OTHER PUBLICATIONS

European Office Action dated Jun. 16, 2020, in connection with corresponding EP Application No. 18178553.6 (8 pp., including machine-generated English translation).

(Continued)

*Primary Examiner* — Tulsidas C Patel
*Assistant Examiner* — Robert E Mates
(74) *Attorney, Agent, or Firm* — Maier & Maier, PLLC

(57) ABSTRACT

A rotor for an electric machine having a rotor shaft, a winding support coupled to the rotor shaft in rotationally fixed manner, and at least one winding arranged on the winding support or a squirrel cage arranged on the winding support, wherein the rotor includes at least one heat pipe running at an angle to the rotor shaft.

19 Claims, 3 Drawing Sheets

(56) References Cited

U.S. PATENT DOCUMENTS

| | | |
|---|---|---|
| 2011/0285339 A1 | 11/2011 | Hyde et al. |
| 2012/0169158 A1* | 7/2012 | Buttner .................. H02K 9/20 310/54 |
| 2012/0256502 A1 | 10/2012 | Le Besnerais |

FOREIGN PATENT DOCUMENTS

| | | |
|---|---|---|
| DE | 2052839 A1 | 4/1972 |
| DE | 42 30 379 A1 | 3/1994 |
| DE | 100 05 006 A1 | 8/2000 |
| DE | 10 2004 056 212 A1 | 6/2006 |
| DE | 10 2005 027 953 A1 | 12/2006 |
| DE | 10 2012 203 691 A1 | 9/2013 |
| DE | 10 2013 020 331 A1 | 7/2014 |
| DE | 10 2014 214 136 A1 | 1/2016 |
| DE | 10 2014 215 645 A1 | 2/2016 |
| EP | 0 012 318 A1 | 6/1980 |
| EP | 2 498 386 A1 | 9/2012 |
| EP | 2509196 A1 | 10/2012 |
| JP | H01-138948 A | 5/1989 |
| JP | H02-79749 A | 3/1990 |
| WO | 01/20713 A1 | 3/2001 |

OTHER PUBLICATIONS

European Office Action dated May 11, 2020, in connection with corresponding EP Application No. 18 178 553.6 (5 pgs., including machine-generated English translation).

Office Action dated Jul. 6, 2020, in corresponding Chinese Application No. 201810843787.6, 15 pages.

Examination Report dated Mar. 28, 2018 of corresponding German application No. 10 2017 213 227.2; 6 pgs.

Examination Report dated Jan. 9, 2020, in corresponding European patent application No. 18178553.6 including partial machine-generated English language translation; 10 pages.

Ron Kemp, "The Heat Pipe—a new tune on an old pipe", Electronics & Power, vol. 19, No. 14, Aug. 1, 1973 (Aug. 1, 1973), p. 325, XP-001453944.

European Search Report dated Aug. 24, 2018, in connection with corresponding EP Application No. 18178553.6 (9 pgs.).

Office Action dated Jan. 16, 2020 in corresponding Chinese Application No. 201810843787.6; 13 pages including English-language translation.

\* cited by examiner

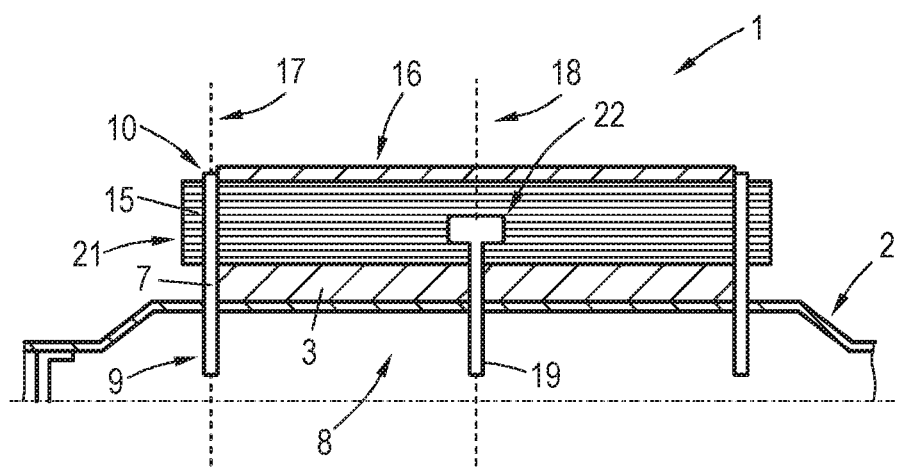
FIG. 4
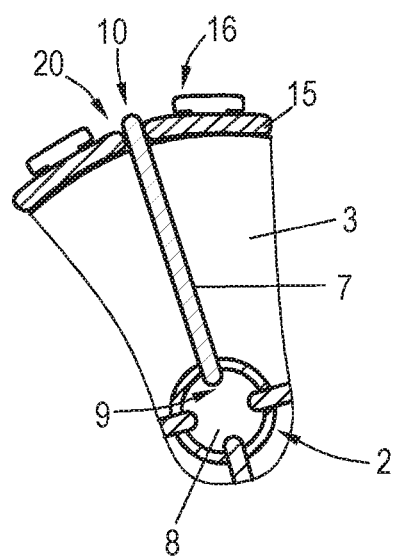 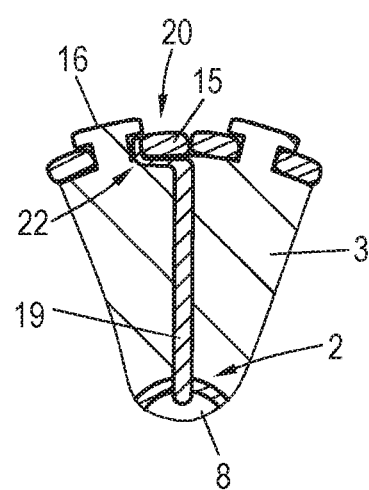
FIG. 5                    FIG. 6

ROTOR FOR AN ELECTRIC MACHINE

FIELD

The invention relates to a rotor for an electric machine having a rotor shaft, a winding support coupled to the rotor shaft in rotationally fixed manner, and at least one winding arranged on the winding support or a squirrel cage arranged on the winding support. In addition, the invention relates to an electric machine and a motor vehicle.

BACKGROUND

In motor vehicles, electric machines are being used increasingly as driving machines.

Here and also in other fields of application of electric machines, the performance of the electric machine, especially the long-term performance, is in many cases limited by the fact that not enough heat can be drawn off from the rotor. The fundamental goal here is to draw off to the outside from the rotating rotor the waste heat which arises primarily in the rotor laminate stack and in the squirrel cage of asynchronous machines or in the rotor winding of externally excited synchronous machines. For example, a cooling can be produced by way of the gas surrounding the rotor. However, the amount of energy that can be drawn off in this manner is greatly limited.

It is therefore known how to cool the rotor alternatively or additionally by an internal rotor cooling, in which a cooling fluid is conveyed through the rotating shaft of the rotor in order to open up a heat transport through the rotor shaft. A similar approach is also used in publication DE 42 30 379 A1, which proposes configuring the rotor shaft as a heat pipe. In this case, there is provided in the rotor shaft a coaxial cavity, which extends along the entire length of the rotor stack and beyond, at least at one end. The cavity is closed on all sides and partly filled with liquid. The problem with a cooling via the rotor shaft is that a major portion of the waste heat to be drawn off is formed at a distance from the rotor shaft. Thus, the amount of heat to be drawn off is limited by the thermal conductivity of the laminate stack.

SUMMARY

Thus, the invention is based on the object of providing a rotor cooling that is improved when compared to the above.

The object is achieved according to the invention by a rotor of the kind mentioned above, in which the rotor comprises at least one heat pipe running at an angle to the rotor shaft.

It is therefore proposed according to the invention to improve the thermal conductivity in a direction at an angle to the rotor shaft, i.e., especially in the radial direction of the rotor, by providing at least one heat pipe running at an angle to the rotor shaft. Since the thermal conductivity of heat pipes is many times higher than the thermal conductivity of customary metallic materials, relatively few and small heat pipes can already greatly improve the radial heat transport in the rotor. In this way, especially for a cooling of the rotor on the side of the rotor shaft, a distinct increase in the cooling power can be accomplished, so that the capability and, in particular, the long-term performance of an electric machine utilizing such a rotor can also be increased.

The heat pipe may comprise a tightly sealed volume, in which a fluid is present that can undergo a phase transition in the course of the heat transport. The fluid may be evaporated at one end that is being cooled, and it may condense once more at a cooled end. The condensed fluid may be transported by capillary forces when using a heat pipe, but also by gravity, such as in the case of a thermal siphon. When using a heat pipe in a rotor, centrifugal force may also be used for the transport of the condensed fluid, when heat is to be conveyed by the heat pipe to the rotor shaft. In this case, the fluid condenses in the region of the rotor shaft and can be drawn off from the rotor by centrifugal force.

The winding or the squirrel cage can be made of a conductive material. The winding may be mounted as a coil. In particular, several coils may be arranged on the winding support, for example, to form an externally excited rotor for a synchronous machine. However, the winding may also be configured in the form of a cage, as a so-called cage winding. In this case, several rods are used, being conductively connected to each other at the end faces of the rotor, in order to short circuit them. Corresponding cages are used in particular for asynchronous machines. Thus, the terms winding and squirrel cage may be used interchangeably.

The winding support may be formed by a laminate stack. The laminate stack may be formed by stacking together mutually insulated laminations. The laminate stack may preferably have several recesses or grooves for the rods of a cage and/or coils, extending in the axial direction and being wound around teeth of the winding support.

The heat pipe may extend in the radial direction of the rotor. In this way, an especially efficient heat transport can be achieved in the radial direction of the rotor. However, it may also be advantageous for the heat pipe or at least one of the heat pipes to be inclined with respect to the radial direction, for example by a maximum of 5° or a maximum of 10°.

The rotor shaft may comprise a cavity receiving a flow of a cooling fluid and/or another heat pipe, extending at least in sections in the longitudinal direction of the rotor shaft. In this way, heat can be drawn off axially via the rotor shaft. The cavity or the heat pipe may extend beyond the winding support at least at one end. The longitudinal direction of the rotor shaft may correspond to the axis of rotation of the rotor when this is used in an electric machine. It thus corresponds to the axial direction of the rotor or the electric machine.

One end of the heat pipe or at least one of the heat pipes on the side of the rotor shaft may contact the other heat pipe directly or across a heat-conducting means and/or border on the cavity or protrude into it. In this way, an especially good thermal coupling is achieved between the heat pipe and the additional heat pipe or the heat pipe and the cooling fluid. As the heat-conducting means, one may use a means having a higher thermal conductivity than the winding support. However, it is also possible to use a thin layer, for example made from a thermally conducting paste or a thermally conducting grouting, serving primarily to even out irregularities of the heat pipe or the additional heat pipe and thereby prevent air pockets. It is sufficient in this case for the thermal conductivity of the heat-conducting means to be higher than the thermal conductivity of air. A contact between the heat pipe and the additional heat pipe is understood to be, in particular, a mechanical contact or a touching of these two elements, by which a good thermal coupling can be achieved.

When using the rotor in an electric machine, large forces may be acting on the winding support, for example, based on the magnetic fields and/or rotational speeds which occur. Therefore, a weakening of the winding support should be prevented by introducing the at least one heat pipe, while at the same time an arrangement of the heat pipe in the vicinity of components relevant to cooling should be achieved. Various possibilities for this shall be discussed in the following:

The heat pipe or at least one of the heat pipes may be led along an axial end face of the winding support. For example, it may rest against a flat axial end face or be led in a recess of the winding support. Due to the end face arrangement, a weakening of the winding support is avoided. In particular, it is possible to arrange at least one heat pipe at each of the two end faces of the winding support.

The winding support may carry windings configured as coils, wherein winding heads of the coils project out in the axial direction of the rotor beyond the winding support, wherein one end of the heat pipe or at least one of the heat pipes facing away from the rotor shaft is arranged between the winding heads of two respective coils in the circumferential direction of the rotor.

Preferably, the end of the respective heat pipe facing away from the rotor shaft may contact at least one of the adjacent coils directly or via a heat-conducting means or a heat-conducting grouting. The winding heads may be those regions of the coils in which the coil wire is led in the circumferential direction of the rotor around the axial ends of the teeth of the winding support. The proposed method makes it possible to draw heat directly away from the coils without having to weaken the winding support.

The squirrel cage may be formed by several rods short circuited by short circuit rings at the end faces of the winding support, wherein one end of the heat pipe or at least one of the heat pipes facing away from the rotor shaft contacts a short circuit ring directly or across a heat-conducting means or a soldered connection and/or is received in a recess of a short circuit ring. In particular, the heat pipe may be led outside the winding support from the rotor shaft to the short circuit ring. In this way, one can avoid a weakening of the winding support and at the same time draw heat away from the short circuit ring or the rods connected to the short circuit ring.

The winding or the squirrel cage may be led, at least in sections, in at least one recess of the winding support, wherein one end of the heat pipe or at least one of the heat pipes facing away from the rotor shaft borders on the recess or protrudes into it. In at least one section of the recess, the heat pipe can be arranged, especially in extensive manner, between the recess wall and the winding or the squirrel cage or between two adjacent windings. The recess may be an axially extending groove, in which, for example, one tooth coil is led as the winding. However, the recess may also be a recess for a short circuiting rod of a cage. By leading the heat pipe to or in the recess, heat can be drawn away especially efficiently from a winding led there or from the squirrel cage.

The heat pipe at the end facing away from the rotor shaft may broaden in a first direction perpendicular to the longitudinal direction of the heat pipe and/or become narrow in a second direction perpendicular to the longitudinal direction and to the first direction. The first direction may be, in particular, the axial direction of the rotor or the electric machine. The second direction may be, in particular, the circumferential direction of the rotor. The widening or narrowing may be carried out, in particular, in that section of the heat pipe protruding into the recess of the winding support containing the winding or the squirrel cage, at least in sections.

Besides the rotor according to the invention, the invention also relates to an electric machine with a stator comprising a rotor according to the invention.

Furthermore, the invention relates to a motor vehicle comprising an electric machine according to the invention.

The electric machine according to the invention and the motor vehicle according to the invention may be modified with features that were discussed for the rotor according to the invention, and vice versa.

BRIEF DESCRIPTION OF THE DRAWINGS

Further benefits and details of the invention will emerge from the following exemplary embodiments as well as the accompanying drawings. Shown herein schematically are:

FIG. 4 fourth exemplary embodiment of rotors according to the invention,

FIG. 5 fifth exemplary embodiment of rotors according to the invention,

FIG. 6 a sixth exemplary embodiment of rotors according to the invention, and FIG. 7 an exemplary embodiment of a motor vehicle according to the invention, including an exemplary embodiment of an electric machine according to the invention.

DETAILED DESCRIPTION

Figure 1:
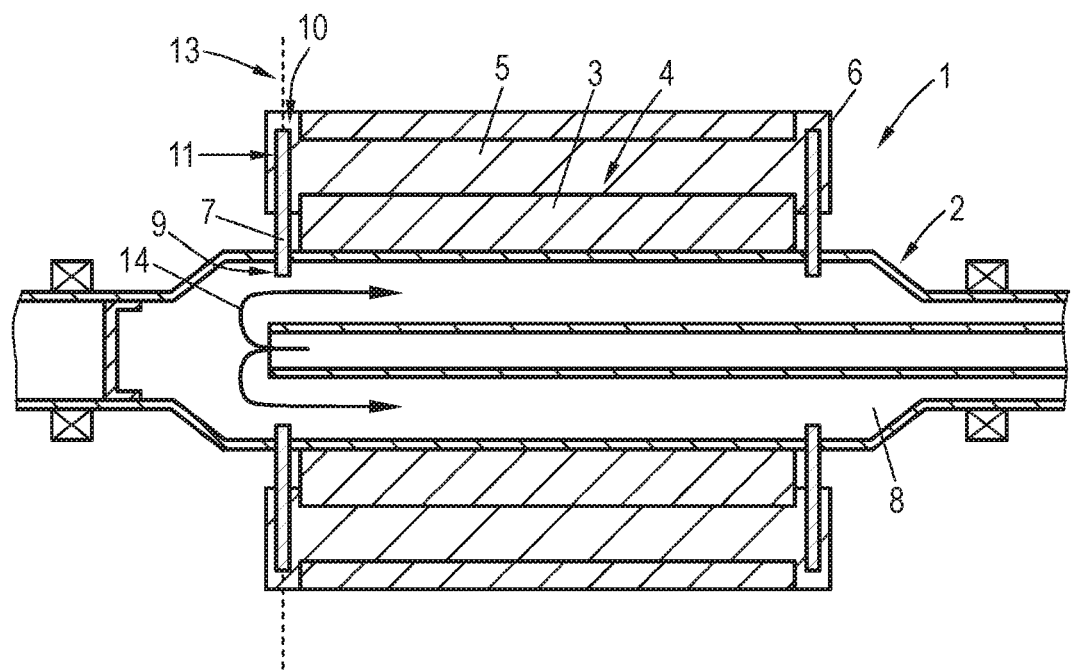
FIG. 1 a first exemplary embodiment of rotors according to the invention.
Figure 2:
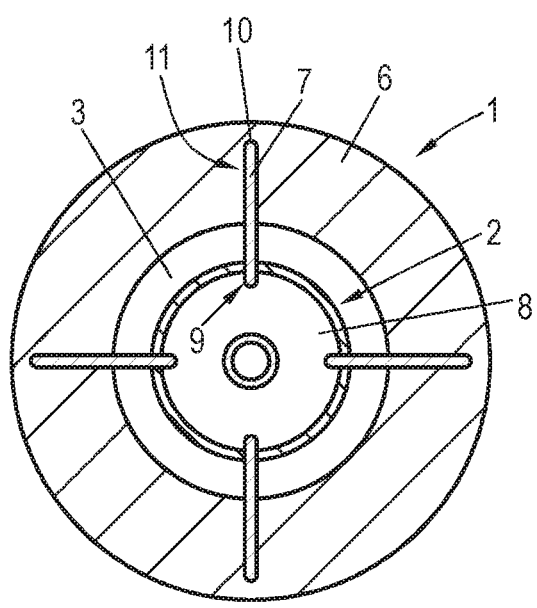
FIG. 2 second exemplary embodiment of rotors according to the invention.

FIG. 1 shows a rotor 1 for an electric machine. A cross section along the dotted line 13 is shown in FIG. 2. The rotor comprises a winding support 3, such as a laminate stack, which is arranged rotationally fixed on a rotor shaft 2. The winding support 3 carries, as its winding, a squirrel cage 4, which is formed by several rods 5, arranged in axial recesses of the winding support 3. The rods 5 are connected in the end faces of the winding support 3 by short circuit rings 6. A corresponding rotor layout is known, in particular, from the field of asynchronous machines and will not be described in detail.

When using the rotor 1 in an electric machine, the rotor becomes heated, especially in the area of the winding or the squirrel cage 4 and also in the edge region of the laminate stack, since eddy currents may be induced here by alternating fields. Because of this heating, the performance of an electric machine may be limited. It is therefore advantageous to cool the rotor 1. For this, a cooling is provided in the rotor 1 on the side of the rotor shaft, whereby the rotor shaft 2 has a cavity 8 receiving a flow of a cooling fluid in order to transport heat axially away from the rotor 1. In order to improve the thermal coupling of the cage and the edge regions of the winding support 3 with this cooling, the rotor 1 comprises several heat pipes 7 standing at an angle to the rotor shaft 2. In the example shown, the heat pipes 7 stand perpendicular to the rotor shaft and thus run in the radial direction of the rotor.

In order to avoid a weakening of the winding support 3 by introducing the heat pipes 7, these pipes are arranged at the end faces of the winding support 3. In the example shown, the heat pipes 7 are spaced away from these end faces, but in theory they may also rest against the end faces or be guided thereon, for example, through grooves.

The end 9 of the heat pipe on the side of the rotor shaft protrudes into the cavity 8 and is thus bathed in the flow of the cooling fluid indicated by the arrows 14. This accomplishes an especially efficient heat exchange between the heat pipe 7 and the cooling fluid. In an alternative exemplary embodiment, the heat pipes 7 may also only border on the cavity 8. This would also be sufficient for a good thermal contact.

The end 10 of the heat pipe 7 facing away from the rotor shaft engages in a recess 11 of the short circuit ring 6. In this way, the winding or the squirrel cage 4 can be cooled directly and the cooling of the edge regions of the winding support 3 is also improved.

Figure 3:
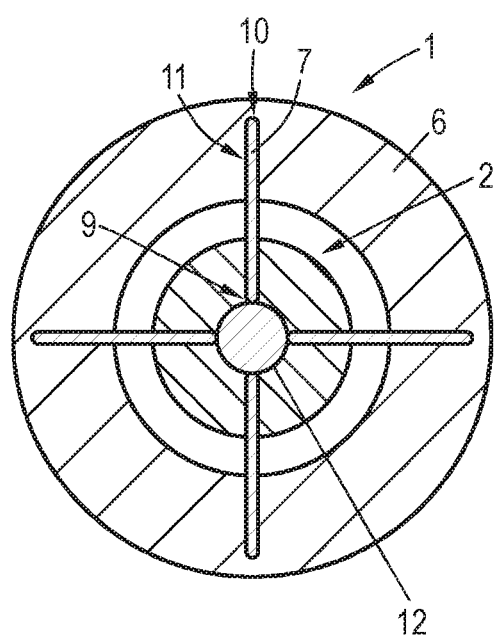
FIG. 3 third exemplary embodiment of rotors according to the invention.

FIG. 3 shows a slight modification of the rotor 1 represented in FIG. 1 and FIG. 2. In order to make possible an axial heat transport, another heat pipe 12 is used in this exemplary embodiment instead of the cavity 8 receiving a flow of a cooling fluid, which was used in FIGS. 1 and 2; this additional pipe extends along at least one section of the rotor shaft 2, and preferably projects out beyond the winding support 3, at least from one end. In order to make possible a good thermal coupling between the heat pipes 7 and the additional heat pipe 12, the heat pipes 7 contact the additional heat pipe 12 mechanically; and in order to improve the thermal coupling a heat-conducting means can be used, for example, a thermally conducting paste.

FIG. 4 shows another exemplary embodiment of a rotor 1, where the winding support 3 in this exemplary embodiment carries several windings 15, which are fashioned as tooth coils. In order to explain the layout of the rotor 1, FIG. 5 shows a cross section along the dotted line 17. The coil wire is led axially through groove-like recesses 20, arranged between the teeth 16, around which the windings 15 are wound. As already stated in the previously discussed exemplary embodiments, the heat pipes 7 are provided at the end faces of the winding support 3. The end 9 of the heat pipes 7 at the side of the rotor shaft ends in a cavity 8 of the rotor shaft 2 through which cooling fluid flows. The end 10 of the heat pipes 7 facing away from the rotor shaft is arranged between the winding heads 21, i.e., those regions of the windings 15 projecting out axially beyond the teeth 16. In this way, an efficient cooling of the windings 15 can be achieved.

For improved cooling of the winding 15, there is additionally provided the heat pipe 19, which passes through the winding support 3. To illustrate the arrangement of the heat pipe 19, FIG. 6 shows a cross section along the dotted line 18. The end 22 of the heat pipe 19 facing away from the rotor shaft protrudes into the recess 20 between the teeth 16 where the windings 15 are led. In order to take up little space in the recess 20, on the one hand, and to provide the largest possible surface for the heat exchange with the windings 15, on the other hand, the end 22 is broadened, as can be seen in FIG. 4. As can be seen in FIG. 6, the heat pipe 19 is furthermore narrowed at its end 22 in the circumferential direction of the rotor 1.

Figure 7:
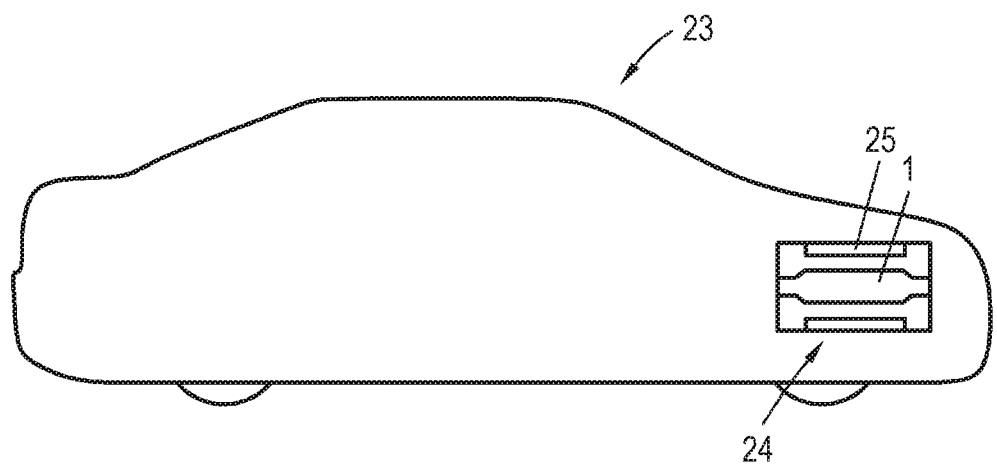

FIG. 7 shows a motor vehicle 23 comprising an electric machine 24, which is formed by a stator 25 and a rotor 1 mounted rotatably in the stator 25. The rotor 1, for example, may be built as discussed with the aid of the previous figures. Thanks to the use of heat pipes, which run at an angle to the rotor shaft 2 of the rotor 1, especially axially with respect to the rotor, the heat transport from the rotor can be significantly improved, which can improve the overall performance of the electric machine 24. This is especially relevant when the electric machine 24 is used as the drive motor for the motor vehicle 23.

The invention claimed is:

1. A rotor for an electric machine, comprising: a rotor shaft, a winding support coupled to the rotor shaft in rotationally fixed manner, and at least one winding arranged on the winding support or a squirrel cage arranged on the winding support, wherein the rotor comprises at least one heat pipe running at an angle to the rotor shaft, wherein the heat pipe at an end facing away from the rotor shaft broadens in a first direction perpendicular to a longitudinal direction of the heat pipe and/or becomes narrow in a second direction perpendicular to the longitudinal direction of the heat pipe and to the first direction.

2. The rotor as claimed in claim 1, wherein the heat pipe extends in a radial direction of the rotor.

3. The rotor as claimed in claim 1, wherein the rotor shaft comprises a cavity receiving a flow of a cooling fluid and/or another heat pipe, which extends, at least in sections in a longitudinal direction of the rotor shaft.

4. The rotor as claimed in claim 3, wherein in one end of the heat pipe or at least one of the heat pipes on a side of the rotor shaft contacts the other heat pipe directly or across a heat-conducting means and/or borders on the cavity or protrudes into it.

5. The rotor as claimed in claim 1, wherein the heat pipe or at least one of the heat pipes is led along an axial end face of the winding support.

6. The rotor as claimed in claim 5, wherein in the winding support carries windings configured as coils, wherein winding heads of the coils project out in an axial direction of the rotor beyond the winding support, wherein one end of the heat pipe or at least one of the heat pipes facing away from the rotor shaft is arranged between the winding heads of two respective coils in a circumferential direction of the rotor.

7. The rotor as claimed in claim 1, wherein the squirrel cage is formed by several rods short circuited by short circuit rings at end faces of the winding support, wherein one end of the heat pipe or at least one of the heat pipes facing away from the rotor shaft contacts a short circuit ring directly or across a heat-conducting means and/or is received in a recess of a short circuit ring.

8. The rotor as claimed in claim 1, wherein the winding or the squirrel cage is led, at least in sections in at least one recess of the winding support, wherein an end of the heat pipe or at least one of the heat pipes facing away from the rotor shaft borders on the recess or protrudes into it.

9. The rotor as claimed in claim 2, wherein the rotor shaft comprises a cavity receiving a flow of a cooling fluid and/or another heat pipe, which extends, at least in sections in a longitudinal direction of the rotor shaft.

10. The rotor as claimed in claim 2, wherein the squirrel cage is formed by several rods short circuited by short circuit rings at end faces of the winding support, wherein one end of the heat pipe or at least one of the heat pipes facing away from the rotor shaft contacts a short circuit ring directly or across a heat-conducting means and/or is received in a recess of a short circuit ring.

11. The rotor as claimed in claim 3, wherein the squirrel cage is formed by several rods short circuited by short circuit rings at end faces of the winding support, wherein one end of the heat pipe or at least one of the heat pipes facing away from the rotor shaft contacts a short circuit ring directly or across a heat-conducting means and/or is received in a recess of a short circuit ring.

12. The rotor as claimed in claim 4, wherein the squirrel cage is formed by several rods short circuited by short circuit rings at end faces of the winding support, wherein one end of the heat pipe or at least one of the heat pipes facing away from the rotor shaft contacts a short circuit ring directly or across a heat-conducting means and/or is received in a recess of a short circuit ring.

13. The rotor as claimed in claim 5, wherein the squirrel cage is formed by several rods short circuited by short circuit rings at end faces of the winding support, wherein one end of the heat pipe or at least one of the heat pipes facing away from the rotor shaft contacts a short circuit ring directly or across a heat-conducting means and/or is received in a recess of a short circuit ring.

14. The rotor as claimed in claim 2, wherein the winding or the squirrel cage is led, at least in sections in at least one recess of the winding support, wherein an end of the heat pipe or at least one of the heat pipes facing away from the rotor shaft borders on the recess or protrudes into it.

15. The rotor as claimed in claim 3, wherein the winding or the squirrel cage is led, at least in sections in at least one recess of the winding support, wherein an end of the heat pipe or at least one of the heat pipes facing away from the rotor shaft borders on the recess or protrudes into it.

16. The rotor as claimed in claim 4, wherein the winding or the squirrel cage is led, at least in sections in at least one recess of the winding support, wherein an end of the heat pipe or at least one of the heat pipes facing away from the rotor shaft borders on the recess or protrudes into it.

17. The rotor as claimed in claim 5, wherein the winding or the squirrel cage is led, at least in sections in at least one recess of the winding support, wherein an end of the heat pipe or at least one of the heat pipes facing away from the rotor shaft borders on the recess or protrudes into it.

18. The rotor as claimed in claim 6, wherein the winding or the squirrel cage is led, at least in sections in at least one recess of the winding support, wherein an end of the heat pipe or at least one of the heat pipes facing away from the rotor shaft borders on the recess or protrudes into it.

19. The rotor as claimed in claim 7, wherein the winding or the squirrel cage is led, at least in sections in at least one recess of the winding support, wherein an end of the heat pipe or at least one of the heat pipes facing away from the rotor shaft borders on the recess or protrudes into it.

* * * * *